US011800840B2

(12) United States Patent
Miller et al.

(10) Patent No.: US 11,800,840 B2
(45) Date of Patent: Oct. 31, 2023

(54) IRRIGATION SYSTEM ALIGNMENT CONTROLLER

(71) Applicant: LINDSAY CORPORATION, Omaha, NE (US)

(72) Inventors: Mark William Miller, Elkhorn, NE (US); Luke Joseph Barker, Omaha, NE (US)

(73) Assignee: LINDSAY CORPORATION, Omaha, NE (US)

( * ) Notice: Subject to any disclaimer, the term of this patent is extended or adjusted under 35 U.S.C. 154(b) by 420 days.

(21) Appl. No.: 16/984,715

(22) Filed: Aug. 4, 2020

(65) Prior Publication Data

US 2022/0039337 A1 Feb. 10, 2022

(51) Int. Cl.
*A01G 25/16* (2006.01)
*A01G 25/09* (2006.01)

(52) U.S. Cl.
CPC ........... *A01G 25/16* (2013.01); *A01G 25/092* (2013.01)

(58) Field of Classification Search
CPC ....... A01G 25/16; A01G 25/092; G01B 21/24
See application file for complete search history.

(56) References Cited

U.S. PATENT DOCUMENTS

| 3,917,171 A | 11/1975 | Reinke | |
| 4,371,116 A * | 2/1983 | Sage | A01G 25/092 336/134 |
| 2013/0087631 A1 | 4/2013 | Pfrenger | |
| 2013/0226356 A1 | 8/2013 | Pfrenger et al. | |
| 2014/0326808 A1 * | 11/2014 | Malsam | B05B 12/12 239/728 |
| 2015/0081120 A1 * | 3/2015 | Pfrenger | G05B 15/02 239/728 |
| 2015/0351334 A1 * | 12/2015 | Abts | A01G 25/092 239/728 |
| 2017/0295730 A1 * | 10/2017 | Abts | A01G 25/092 |
| 2017/0359974 A1 * | 12/2017 | Whalley | A01G 25/162 |
| 2020/0396911 A1 * | 12/2020 | Stouffer | A01G 25/16 |
| 2021/0007298 A1 * | 1/2021 | Thatcher | G05B 19/0425 |

OTHER PUBLICATIONS

International Search Report and Written Opinion dated Nov. 9, 2021 for PCT/US2021/042190, filed Jul. 19, 2021 and all references cited therein.

* cited by examiner

*Primary Examiner* — Chad G Erdman
(74) *Attorney, Agent, or Firm* — HOVEY WILLIAMS LLP

(57) ABSTRACT

An alignment control system for controlling an alignment of a plurality of mobile towers, each mobile tower supporting a section of conduit in an irrigation system comprises a plurality of tower angle measurement devices and a control processing element. Each tower angle measurement device is associated with a successive one of the mobile towers and is configured to measure an angle value which varies according to a rotation angle of the associated mobile tower relative to one or more of the other mobile towers. The control processing element is configured or programmed to receive the angle value from each tower angle measurement device, compare the angle value to a threshold angle value, and generate and transmit control signals, data, or both that include an activation hysteresis value to a drive motor associated with each mobile tower that has an angle value greater than the threshold angle value.

17 Claims, 7 Drawing Sheets

IRRIGATION SYSTEM ALIGNMENT CONTROLLER

FIELD OF THE INVENTION

Embodiments of the current invention relate to control systems and methods for controlling an alignment of a plurality of towers of an irrigation system.

BACKGROUND

Crops are cultivated throughout the world in a wide variety of climates with different terrains and soils. It is desirable in many of these climates to artificially supplement the climate's natural precipitation via irrigation systems to ensure crops receive adequate water. Additionally, irrigation systems can be used to deliver fertilizers and chemicals to, among other things, promote healthy crop growth, suppress weeds, and protect crops from frost.

Common irrigation systems include center-pivot systems and lateral-move systems, each having an elevated, elongated pipe supported by a plurality of drive towers spaced along the pipe. The pipe includes a plurality of spaced sprinklers that may extend downward toward the crops to enable distribution of water to the crops from above. Center-pivot systems are ideal for use in fields having circular crop areas and generally include a hydrant located in the middle of each circular crop area. In such systems, a plurality of spans are linked together radially outward from the hydrant. Each span includes a tower and a truss assembly that supports the pipe and the sprinklers which deliver water to the crop area while the spans rotate about the hydrant. Lateral-move systems are ideal for use in square, rectangular, and irregular-shaped fields. Such systems generally include one or more hydrants located in and/or adjacent to a field and/or one or more ditches located along or through a field that are connected to the pipe and the sprinklers. Unlike the center-pivot system having a pipe with a stationary end, the pipe in a lateral-move system is connected to and extends from a movable cart designed to traverse up and down a cart path. The pipe may be locked at an angle perpendicular to the cart path and pivot at an end at the cart path, which is desirable if the cart path extends down the middle of a field to enable pivoting from one side of the cart path to the other with each pass along the cart path.

In both center-pivot and lateral move systems, each span may have a length, for example, of one hundred thirty five feet to two hundred feet. In center-pivot systems, there may be up to twenty-two spans. To move the span during an irrigation operation, each of the drive towers includes two or more wheels that are fixed in orientation and driven by a mechanical drive unit. The mechanical drive units may be a series of electric motors or other similar sources of propulsion. In general, the mechanical drive units propel the span forward or backward in a circular or lateral pattern along a field and over crops, to provide crop irrigation.

Typically, the spans are driven at different times so that some spans may be moving while others spans are stationary. This type of staggered operation means that the spans are often out of alignment with one another. In other words, each tower may be oriented at a nonzero angle with respect to its adjacent towers. Each tower is usually driven once its tower to tower alignment angle exceeds a certain value. However, the towers may not be driven for a long enough time or for a great enough distance to maintain proper alignment.

SUMMARY OF THE INVENTION

Embodiments of the current invention solve the above-mentioned problems and provide a distinct advance in the art of controlling an alignment of mobile towers in an irrigation system. Specifically, embodiments of the present invention may provide an alignment control system for controlling the alignment of a plurality of mobile towers, with each mobile tower supporting a section of conduit in an irrigation system. The alignment control system broadly comprises a plurality of tower angle measurement devices and a control processing element. Each tower angle measurement device is associated with a successive one of the mobile towers and is configured to measure an angle value which varies according to a rotation angle of the associated mobile tower relative to one or more of the other mobile towers. The control processing element is configured or programmed to receive the angle value from each tower angle measurement device, compare the angle value to a threshold angle value, and generate and transmit control signals, data, or both that include an activation hysteresis value to a drive motor associated with each mobile tower that has an angle value greater than the threshold angle value.

Embodiments of the current invention also provide an irrigation system broadly comprising a conduit, a central pivot, a plurality of mobile towers, and an alignment control system. The conduit is configured to carry fluid for irrigating crops and includes a plurality of sections coupled to one another. The central pivot is configured to supply the fluid to the conduit. The mobile towers are configured to rotate the conduit around the central pivot. Each mobile tower includes a truss section configured to support the conduit, and a drive motor configured to propel the mobile tower. The alignment control system controls an alignment of the mobile towers and includes a plurality of tower angle measurement devices and a control processing element. Each tower angle measurement device is associated with a successive one of the mobile towers and is configured to measure an angle value which varies according to a rotation angle of the associated mobile tower relative to one or more of the other mobile towers. The control processing element is configured or programmed to receive the angle value from each tower angle measurement device, compare the angle value to a threshold angle value, and generate and transmit control signals, data, or both that include an activation hysteresis value to the drive motor associated with each mobile tower that has an angle value greater than the threshold angle value.

Embodiments of the current invention further provide a method for controlling an alignment of a plurality of mobile towers, each mobile tower supporting a section of conduit in an irrigation system. The method broadly comprises receiving a plurality of angle values, each angle value received from a successive one of a plurality of tower angle measurement devices, each tower angle measurement device associated with a successive one of the mobile towers; comparing each angle value to a threshold angle value; generating and transmitting control signals, data, or both that include an activation hysteresis value to a drive motor associated with each mobile tower whose angle value greater than the threshold angle value; and activating the drive motor for a duration of the activation hysteresis value.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
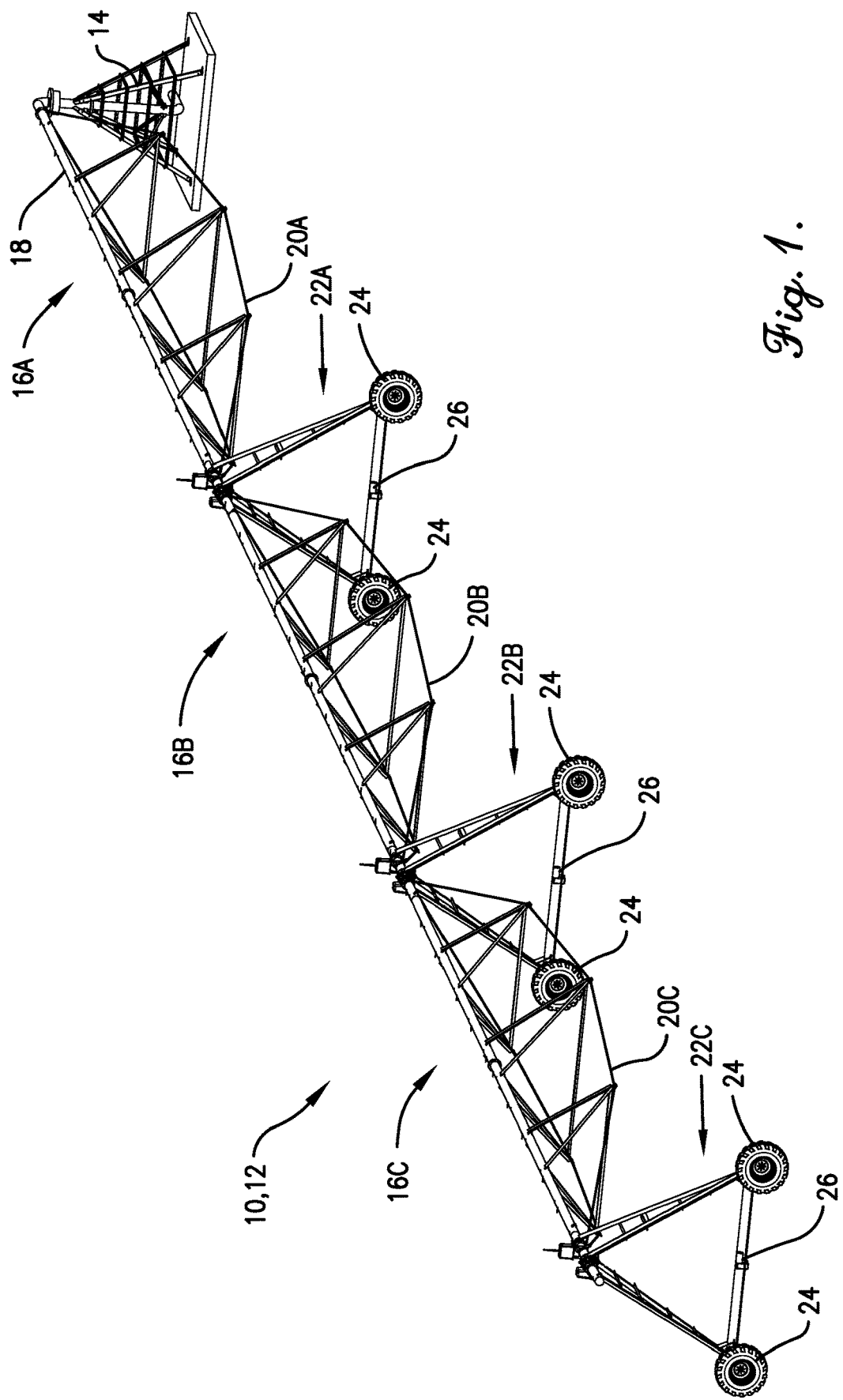
FIG. 1 is an upper perspective environmental view of an irrigation system including an alignment control system constructed in accordance with various embodiments of the invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

An irrigation system 10 comprising an alignment control system 12, constructed in accordance with various embodiments of the current invention, is shown in FIG. 1. An exemplary irrigation system 10 is a central pivot irrigation system and broadly comprises a fixed central pivot 14 and a plurality of spans 16 pivotally connected to the central pivot. The irrigation system 10 may also comprise an extension arm (also commonly referred to as a "swing arm" or "corner arm") pivotally connected to the free end of the outermost span 16. The irrigation system 10 may also be embodied by a lateral, or linear, move apparatus without departing from the scope of the current invention.

The fixed central pivot 14 may be a tower or any other support structure about which the spans 16 pivot or rotate. The central pivot has access to a well, water tank, or other source of water and may also be coupled with a tank or other source of agricultural products to inject fertilizers, pesticides and/or other chemicals into the water for application during irrigation. The central pivot 14 may supply water to a conduit 18 or pipe which carries the water along the length of the spans 16.

The irrigation system 10 may comprise up to twenty-two spans 16. The exemplary irrigation system 10 shown in the figures includes three spans 16A, 16B, 16C. Each span 16 includes a truss section 20 (20A, 20B, 20C in the figures) and a mobile tower 22 (22A, 22B, 22C in the figures). The truss section 20 includes a plurality of beams rigidly connected to one another to form a framework which carries or otherwise supports the conduit 18 and other fluid distribution mechanisms that are connected in fluid communication to the conduit 18. Fluid distribution mechanisms may include sprayers, diffusers, or diffusers, each optionally attached to a drop hose, or the like. In addition, the conduit 18 may include one or more valves which control the flow of water through the conduit 18. The opening and closing of the valves may be automatically controlled with an electronic signal or digital data.

Figure 4:
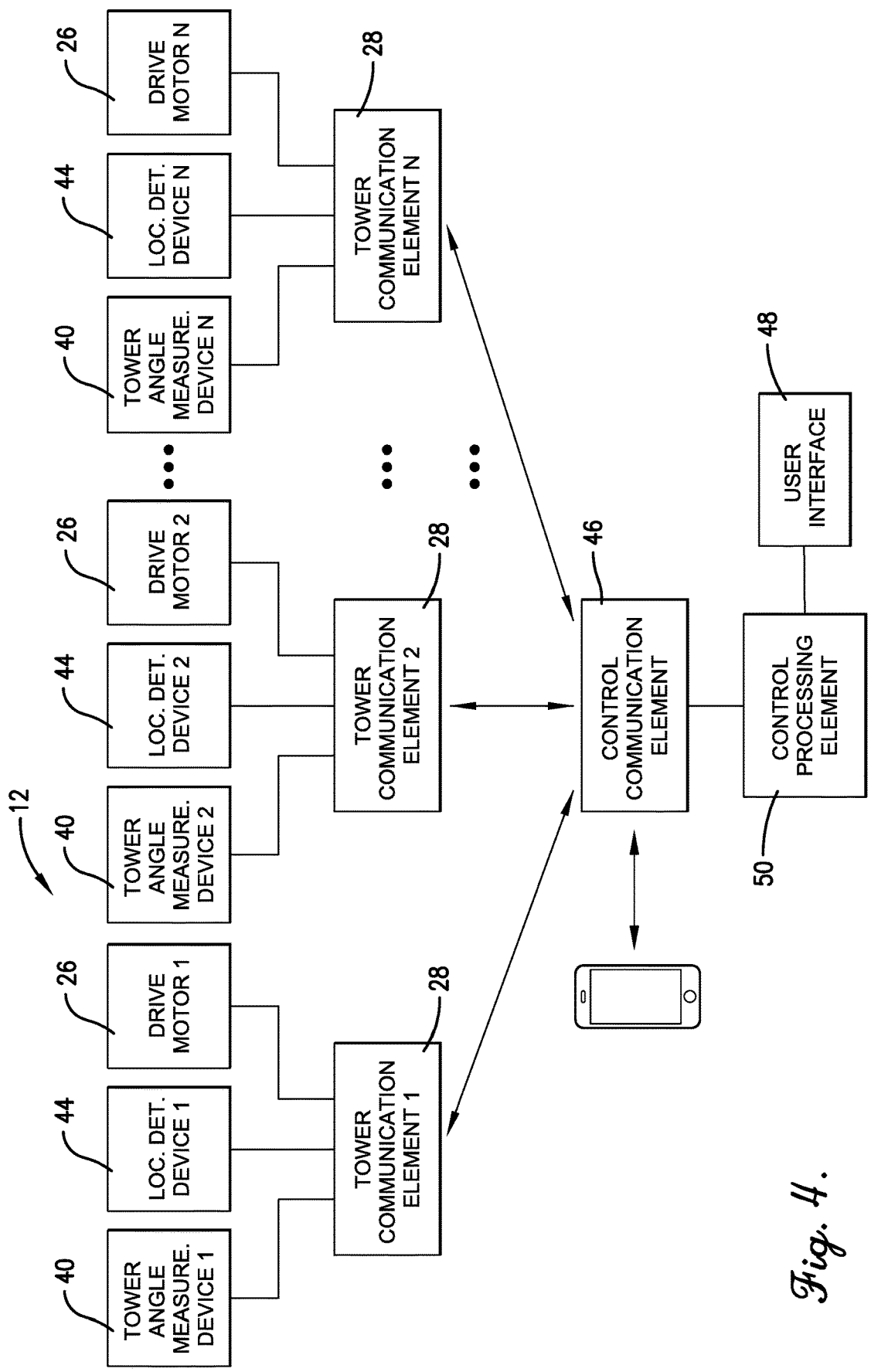
FIG. 4 is a schematic block diagram of electronic components of the alignment control system.
Figure 5:
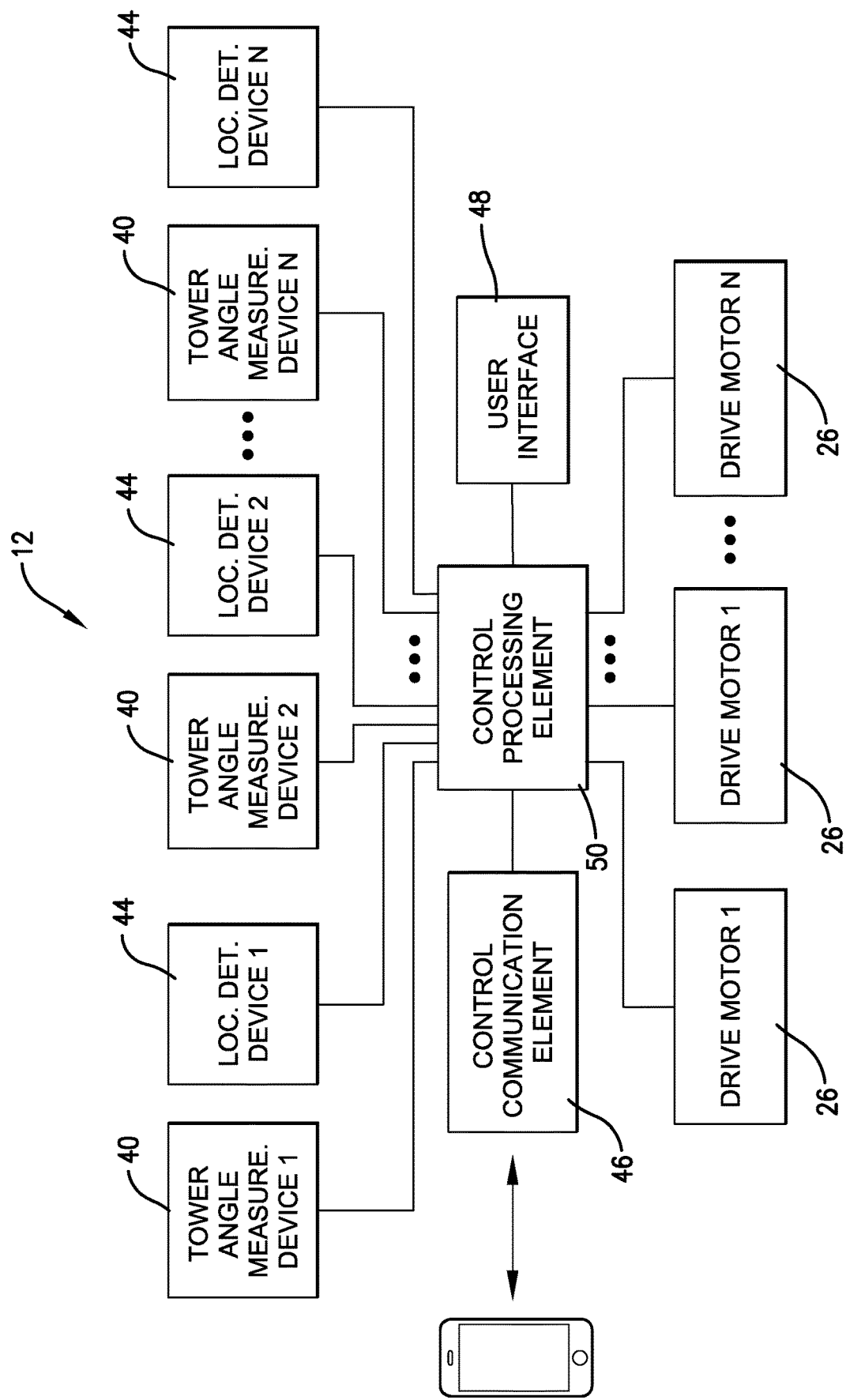
FIG. 5 is a schematic block diagram of electronic components of an alternative embodiment of the alignment control system.

The mobile tower 22 is positioned at the outward end of the span 16 and includes at least two wheels 24, at least one of which is driven by a drive motor 26. The drive motor 26 includes an electric motor, such as an alternating current (AC) motor or a direct current (DC) motor, and may drive the wheel 24 directly or through a drive shaft in order to propel the mobile tower 22 forward or backward. The operation of the drive motor 26 may be controlled by a variable frequency drive (VFD) motor controller. The drive motor 26, or controller, may receive control signals and/or data about its operation, such as whether to turn on or off, the speed of travel, and the direction of travel, either wirelessly through a tower communication element 28, as shown in FIG. 4, or hard wired through cables, as shown in FIG. 5.

Each mobile tower 22 further includes a plurality of beams rigidly connected to one another to form a framework which couples the conduit 18 and the truss section 20 to the wheels 24 and the drive motor 26.

Figure 2:
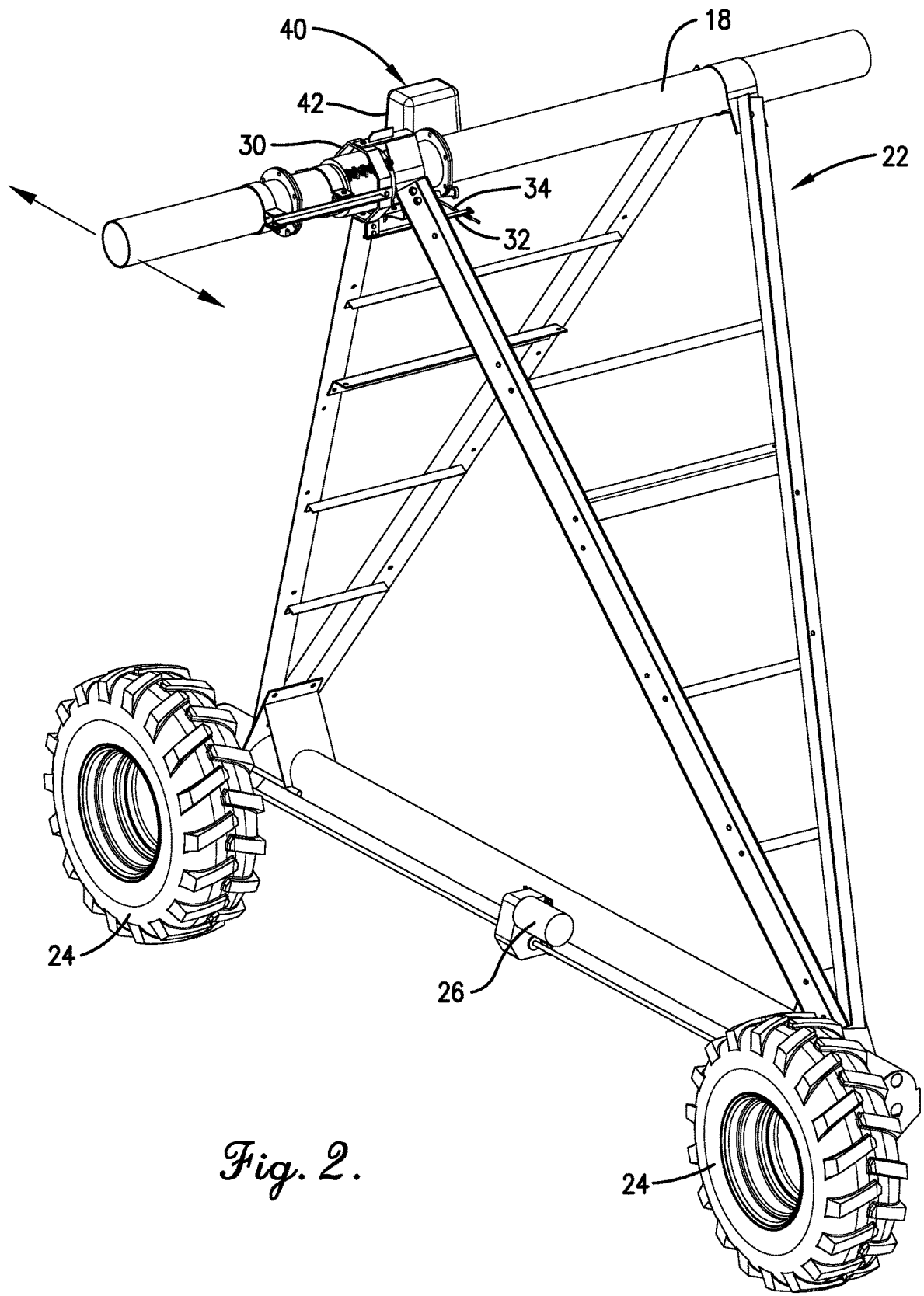
FIG. 2 is an upper perspective view of a mobile tower of the irrigation system, highlighting a joint between a first section of a conduit and a second section of the conduit.
Figure 3:
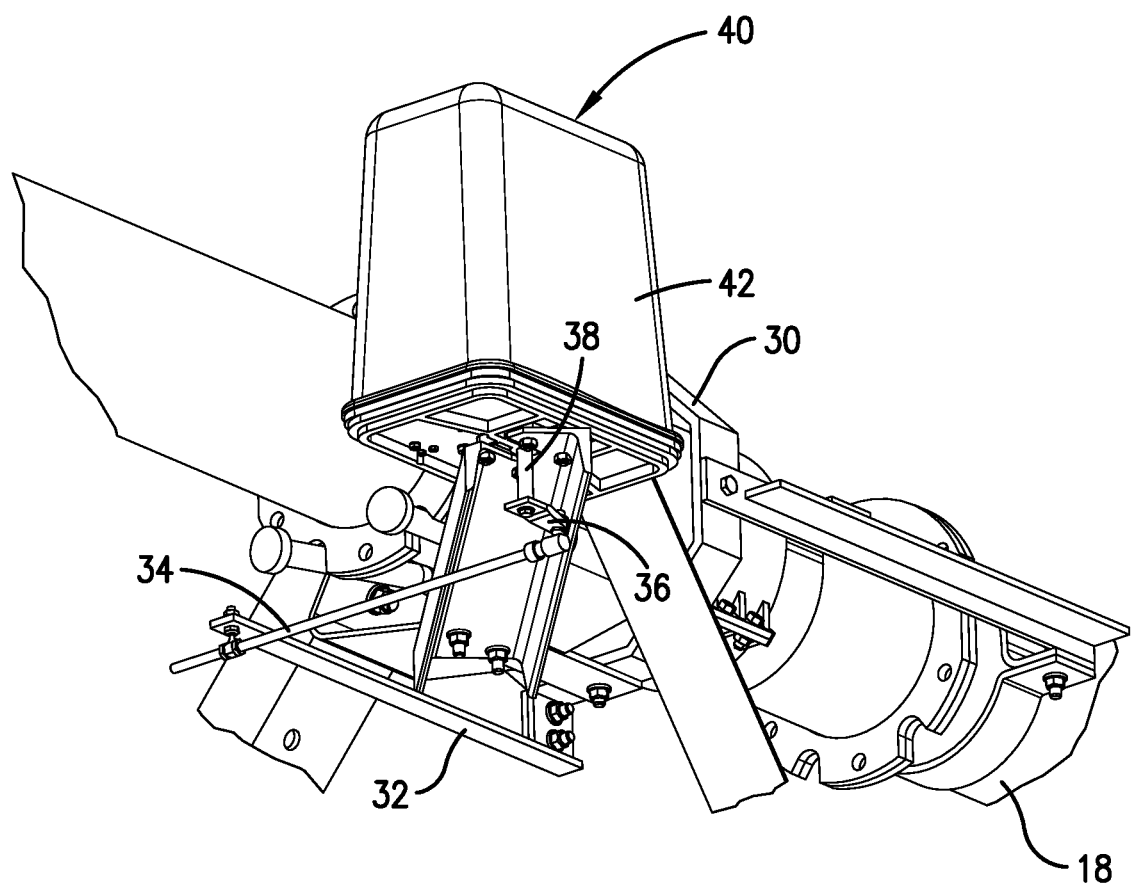
FIG. 3 is a lower perspective view of components of the alignment control system in proximity to the joint.

Referring to FIGS. 2 and 3, each span 16 includes joint components where a section of conduit 18 associated with one span 16 couples to a section of conduit 18 associated with an adjacent span 16, which forms a joint in the conduit 18 at the inward end of each span 16. The conduit 18 is configured to rotate, pivot, or flex at the joint when the outward span 16 moves with respect to the inward span 16, as would occur when the outward span 16 is propelled at a different speed from the inward span 16. The joint components include an alignment ring 30, a linkage bar 32, a linkage rod 34, a linkage joint 36, and an alignment shaft 38. The alignment ring 30 encircles the conduit 18 and moves or shifts when the outward span 16 moves with respect to the inward span 16. A first end of the linkage bar 32 is rigidly coupled to the alignment ring 30. The linkage bar 32 moves in a first direction when the alignment ring 30 moves or shifts. A first end of the linkage rod 34 is rotatably coupled to a second end of the linkage bar 32. The linkage rod 34 moves in a second direction, roughly transverse to the first direction, when the linkage bar 32 moves. A first end of the linkage joint 36 is rotatably coupled to a second end of the linkage rod 34. A second end of the linkage joint 36 is rigidly coupled to the alignment shaft 38. The linkage joint 36 converts the general translational movement of the linkage rod 34 to rotational movement, such that a rotational angle of the alignment shaft 38 varies according to, is proportional to, or corresponds to, a tower to tower alignment angle, which is also a rotational angle between a centerline of the section of conduit 18 associated with the outward span 16 or mobile tower 22 and a centerline of the section of conduit 18 associated with the inward span 16 or mobile tower 22, as shown in FIG. 6.

The alignment shaft 38 is coupled to at least one embodiment of a tower angle measurement device 40, discussed in more detail below, which is positioned within a housing 42 coupled to the mobile tower 22. The alignment shaft 38 may also be coupled to a cam whose rotation opens and closes an alignment switch and a safety switch as part of an additional alignment control system described in U.S. Pat. No. 9,538,712, issued Jan. 10, 2017 and incorporated by reference into the current document in its entirety.

The alignment control system 12 includes a plurality of tower angle measurement devices 40 (one for each mobile tower 22), a plurality of location detection devices 44 (one for each mobile tower 22), a control communication element 46, a user interface 48, and a control processing element 50. The alignment control system 12 may optionally include a plurality of tower communication elements 28 (one for each mobile tower 22) so that the control processing element 50 may communicate wirelessly with the components of each mobile tower 22, as shown in FIG. 4. Alternatively, the control processing element 50 may communicate with the components of each mobile tower 22 in a wired fashion directly through electrically conductive cables or wiring, as shown in FIG. 5.

Figure 6:
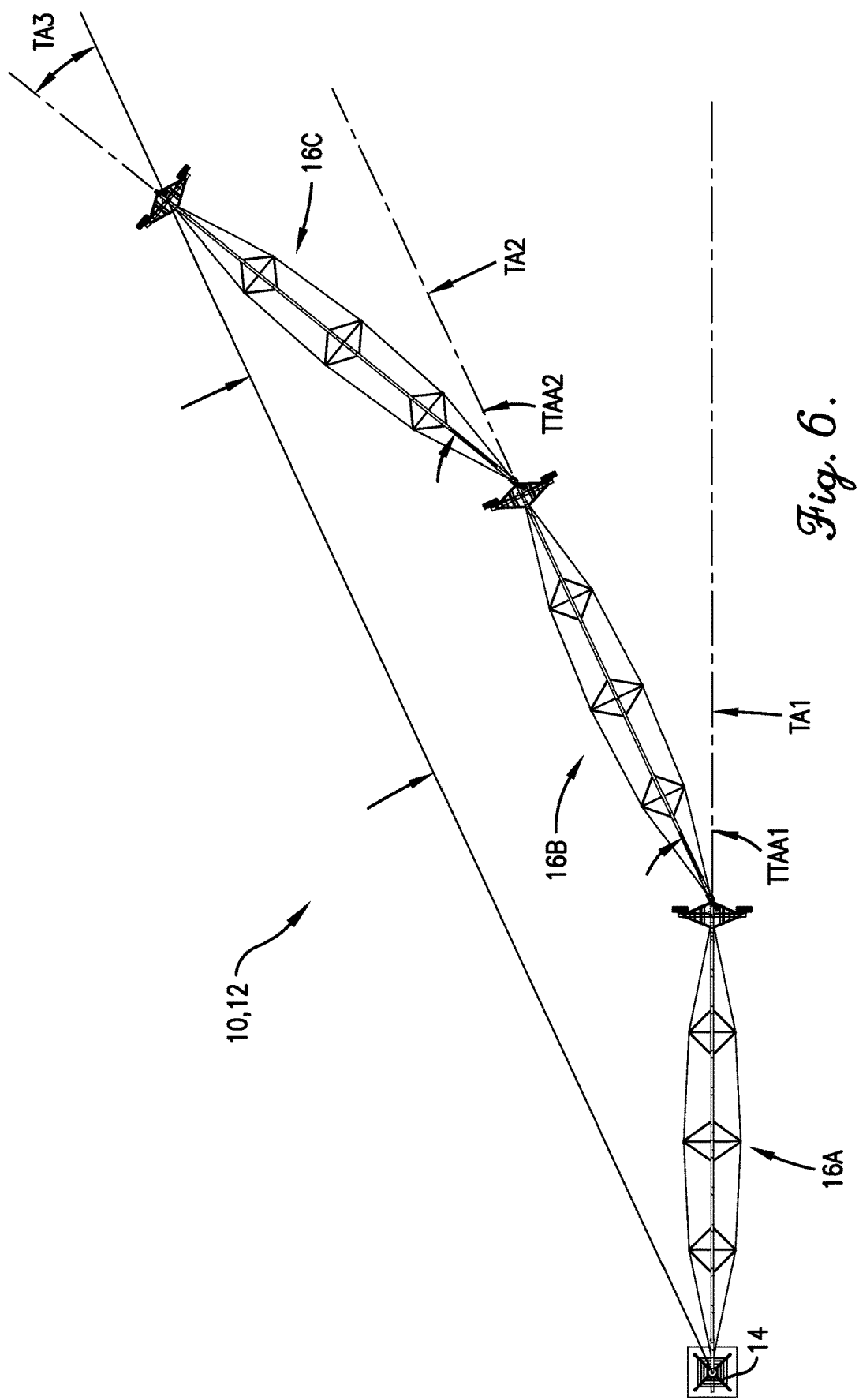
FIG. 6 is a top view of the irrigation system and the alignment control system highlighting various angles between the mobile towers.

Referring to FIG. 6, each tower angle measurement device 40 determines the tower to tower alignment angle (TTAA) between its associated mobile tower 22 and its inward adjacent mobile tower 22, except for the first mobile tower 22, which is adjacent to the central pivot 14. Additionally, or alternatively, the tower angle measurement device 40 may determine a trim angle (TA), which is a rotational angle between the centerline of the associated mobile tower 22 and a line drawn from the central pivot 14 to a center of the outermost mobile tower 22. The trim angle may provide an indication of the alignment each mobile tower 22 has with the overall irrigation system 10. In some embodiments, the tower angle measurement device 40 may include a potentiometer that outputs an electric voltage, an electric current, or an electric resistance which varies according to the tower to tower alignment angle or the trim angle. The tower angle measurement device 40 may further include an analog to digital converter (ADC) to convert the voltage, current, or resistance to digital data. The tower angle measurement device 40 may alternatively include a rotary encoder that outputs data or a code which varies according to the tower to tower alignment angle or the trim angle. The potentiometer or the encoder are rigidly coupled to the alignment shaft 38 associated with the joint between adjacent spans 16. In other embodiments, the tower angle measurement device 40 may include an analog proximity sensor, an analog laser proximity sensor, or an analog ultrasonic proximity sensor which measure the angular deflection of the sections of conduit 18 of adjacent spans 16 relative to one another. In still other embodiments, the tower angle measurement device 40 may include strain or stress measurement devices, such as strain gauges, to measure the strain or stress on the sections of conduit 18 caused by the angular deflection on the conduit 18 due to the joint of two sections of conduit 18. The tower angle measurement device 40 may communicate the tower to tower alignment angle and/or trim angle through an associated tower communication element 28 to the control processing element 50 as a code or digital data. Or the tower angle measurement device 40 may communicate the tower to tower alignment angle and/or trim angle directly through cabling or wires to the control processing element 50 as a code, as digital data, or as an analog voltage, current, or other electrical characteristic.

Each location detection device 44 generally determines a current geolocation of the mobile tower 22 with which it is located and may receive and process radio frequency (RF) signals from a multi-constellation global navigation satellite system (GNSS) such as the global positioning system (GPS) utilized in the United States, the Galileo system utilized in Europe, the GLONASS system utilized in Russia, or the like. The location detection device 44 may accompany or include an antenna to assist in receiving the satellite signals. The antenna may be a patch antenna, a linear antenna, or any other type of antenna that can be used with location or navigation devices. The location detection device 44 may include satellite navigation receivers, processors, controllers, other computing devices, or combinations thereof, and memory. The location detection device 44 may process a location electronic signal communicated from the antenna which receives the location wireless signal from one or more satellites of the GNSS. The location wireless signal includes data from which geographic information such as the current geolocation is derived. The current geolocation may include coordinates, such as the latitude and longitude, of the current location of the mobile tower 22. The location detection device 44 may communicate the current geolocation as digital data to the control processing element 50 through an associated tower communication element 28 or directly through cabling or wires.

The control communication element 46 generally allows the control processing element 50 to communicate with the tower communication elements 28 (if utilized) as well as mobile electronic devices, external systems, networks, and the like. The control communication element 46 may include signal and/or data transmitting and receiving circuits, such as antennas, amplifiers, filters, mixers, oscillators, digital signal processors (DSPs), and the like. The control communication element 46 may establish communication wirelessly by utilizing radio frequency (RF) signals and/or data that comply with communication standards such as cellular 2G, 3G, 4G, Voice over Internet Protocol (VoIP), LTE, Voice over LTE (VoLTE), or 5G, Institute of Electrical and Electronics Engineers (IEEE) 802.11 standard such as WiFi, IEEE 802.16 standard such as WiMAX, Bluetooth™, or combinations thereof. In addition, the control communication element 46 may utilize communication standards such as ANT, ANT+, Bluetooth™ low energy (BLE), the industrial, scientific, and medical (ISM) band at 2.4 gigahertz (GHz), or the like. The control communication element 46 may be in electronic communication with the control processing element 50.

The tower communication elements 28 communicate with the control communication element 46 which allows for the tower angle measurement devices 40 and the location detection devices 44 to send data to the control processing element 50 and for the control processing element 50 to send control information and data to the drive motors 26, as discussed in more detail below. Each tower communication element 28 includes the same structure, function, and operation as the control communication element 46.

The user interface 48 generally allows the user to utilize inputs and outputs to interact with the control processing element 50. The user interface 48 may be retained in a housing located at, or near, the central pivot. Inputs may include a touchscreen, buttons, pushbuttons, knobs, jog dials, shuttle dials, directional pads, multidirectional buttons, switches, keypads, keyboards, mice, joysticks, microphones, or the like, or combinations thereof. Outputs may include a display, audio speakers, lights, dials, meters, or the like, or combinations thereof. Additionally, or alternatively, the user interface 48 may include a software interface that is implemented in a mobile electronic device application, a desktop or laptop computer application, a website application, or the like. The user interface 48 allows the user to interact with the control processing element 50 to control the features, functions, and operation of the irrigation system 10.

The control processing element 50 may comprise one or more processors. The control processing element 50 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The control processing element 50 may generally execute, process, or run instructions, code, code segments, code statements, software, firmware, programs, applications, apps, processes, services, daemons, or the like. The control processing element 50 may also include hardware components such as registers, finite-state machines, sequential and combinational logic, configurable logic blocks, and other electronic circuits that can perform the functions necessary for the operation of the current invention. In certain embodiments, the control processing element 50 may include multiple computational components and functional blocks that are packaged separately but function as a single unit. The control processing element 50 may be in electronic communication with the other electronic components through serial or parallel links that include universal busses, address busses, data busses, control lines, and the like.

The control processing element 50 may include, perhaps as an embedded device or an integrated device, or be in electronic communication with, a memory element. The memory element may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element may be embedded in, or packaged in the same package as, the control processing element 50. The memory element may include, or may constitute, a non-transitory "computer-readable medium". The memory element may store the instructions, code, code statements, code segments, software, firmware, programs, applications, apps, services, daemons, or the like that are executed by the control processing element 50. The memory element may also store data that is received by the control processing element 50 or the device in which the control processing element 50 is implemented. The control processing element 50 may further store data or intermediate results generated during processing, calculations, and/or computations as well as data or final results after processing, calculations, and/or computations. In addition, the memory element may store settings, data, documents, sound files, photographs, movies, images, databases, and the like.

The control processing element 50 may be operable, configured, or programmed to perform the following functions by utilizing hardware, software, firmware, or combinations thereof. The control processing element 50 receives the angle value from each tower angle measurement device 40. The angle value includes data regarding the position of each mobile tower 22 relative to one or more other mobile towers 22. The angle information may include the tower to tower alignment angle or the trim angle. In addition, the control processing element 50 receives geolocation data from the location detection device 44 associated with each mobile tower 22 regarding the location of the mobile tower 22. Furthermore, the control processing element 50 may receive location correction or enhancement information from terrestrial reference stations utilizing real-time kinematic (RTK) standards or protocols. Using the received geolocation information regarding each mobile tower 22 and the known geolocation information about the central pivot 14, the control processing element 50 may determine, compute, or calculate the tower to tower alignment angle and/or the trim angle for each of the mobile towers 22.

The control processing element 50 receives or determines an angle value (tower to tower alignment angle or trim angle) for each mobile tower 22. The control processing element 50 also receives an angle threshold value from a user, that is a technician, operator, or owner, through the user interface 48 at the central pivot 14 or from a mobile electronic device or a computer executing an app or visiting a website. The angle threshold value may be a rotational angular value such as 10 degrees. The control processing element 50 compares the angle from the angle information to the angle threshold value. For each mobile tower 22, if the angle value is less than or equal to the angle threshold value, then no action is taken. If the angle value is greater than the angle threshold value, then the control processing element 50 generates and transmits control signals and/or data to the drive motor 26 of the associated mobile tower 22 (either through the control communication element and the associated tower communication element 28 or directly through cabling or wires) to activate the drive motor 26. The control signals and/or data may include a direction to travel and a speed. The control signals and/or data may also include an activation hysteresis value, which determines or defines a parameter whose requirements must be satisfied while the drive motor 26 is activated. The activation hysteresis value may include a period of time for the drive motor 26 to be activated, a distance for the drive motor 26 to propel the associated mobile tower 22, or a tower to tower alignment angle or trim angle for the drive motor 26 to propel the mobile tower 22 back to. For example, the activation hysteresis value may include a period of time value of, say, 120 seconds during which the drive motor 26 is activated to propel its associated mobile tower 22. The activation hysteresis value may include a distance value of, say, 200 feet for the drive motor 26 to propel its associated mobile tower 22. The activation hysteresis value may include the angle value of, say, 5 degrees to which the drive motor 26 propels its associated mobile tower 22. Generally, the drive motor 26 is activated for the activation hysteresis value, and then is deactivated. In some embodiments, the control processing element 50 may generate and transmit the control signals and/or data continuously, or nearly continuously, as the drive motor 26 is activated. In other embodiments, the control processing element 50 may generate and transmit the control signals and/or data to the drive motor 26 (or its controller) a single time before a cycle of activation. The control processing element 50 may perform the same process for each mobile tower 22.

The activation hysteresis value may be the same value or may be a different value for each mobile tower 22. Or, the activation hysteresis value may be the same value for each group of a plurality of groups of mobile towers 22. In addition, the activation hysteresis value for each mobile tower 22 may vary according to a direction of travel of the mobile tower 22. For example, the activation hysteresis value may have a first value when the mobile tower 22 is traveling in a forward direction and a second value when the mobile tower 22 is traveling in a reverse direction. Furthermore, the user may be able to select or change the activation hysteresis value through the user interface 48 at the central pivot 14 or from a mobile electronic device or a computer executing an app or visiting a website.

Figure 7:
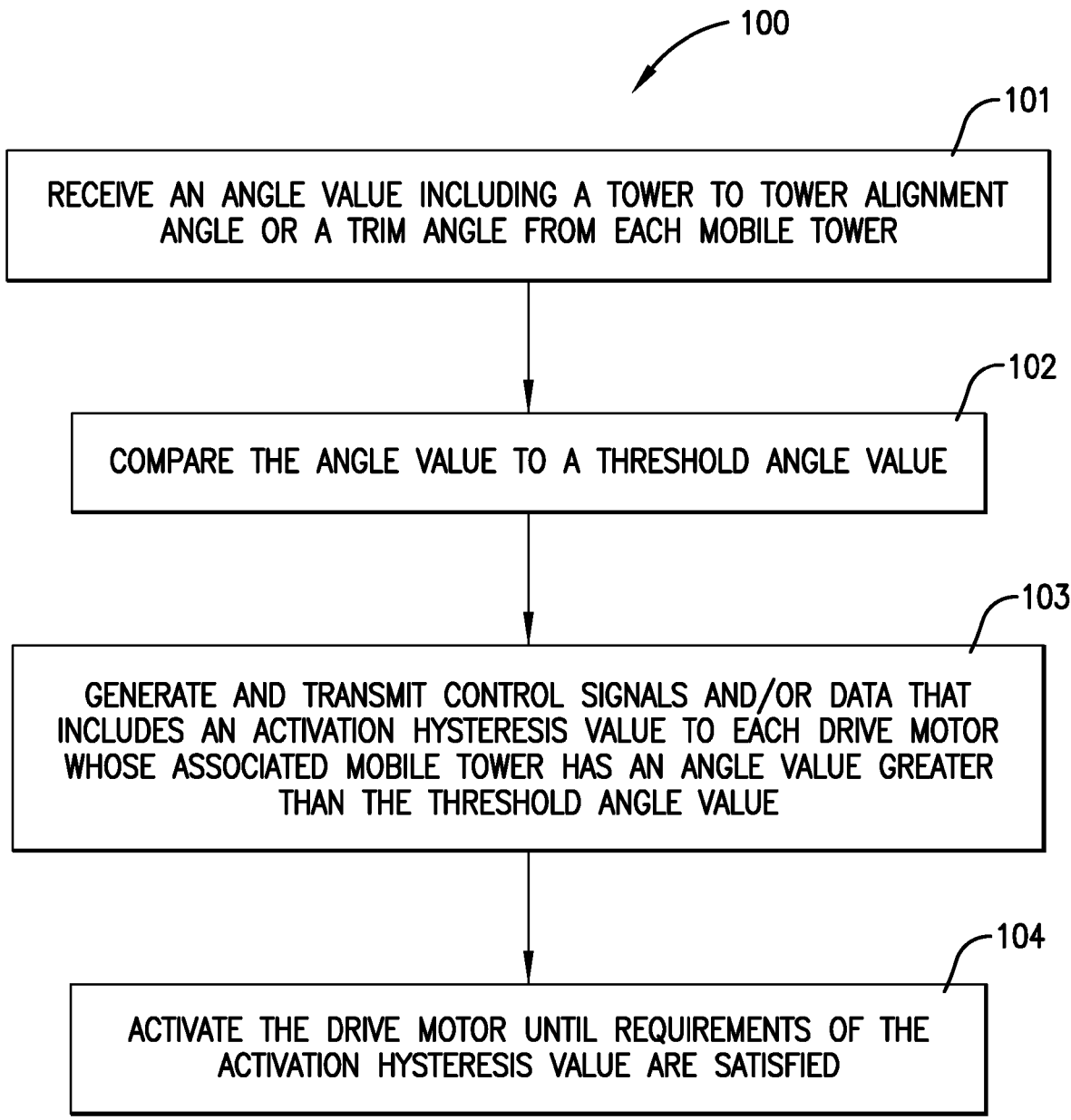
FIG. 7 is a listing of at least a portion of the steps of a method for controlling an alignment of a plurality of spans in the irrigation system.

FIG. 7 depicts a listing of at least a portion of the steps of an exemplary method 100 for controlling an alignment of a plurality of spans 16 in an irrigation system 10. The steps may be performed in the order shown in FIG. 7, or they may be performed in a different order. Furthermore, some steps may be performed concurrently as opposed to sequentially. In addition, some steps may be optional or may not be performed.

Referring to step 101, an angle value including a tower to tower alignment angle or a trim angle from each mobile tower 22 is received. Each mobile tower 22 includes a tower angle measurement device 40 which measures the angle value of the mobile tower 22 and an optional tower communication element 28 which wirelessly communicates the angle value to the control processing element 50. The tower to tower alignment angle is an angle between a centerline of the section of conduit 18 associated with the outward span 16 and a centerline of the section of conduit 18 associated with the inward span 16. The trim angle is an angle between the centerline of the associated mobile tower 22 and a line drawn from the center pivot to a center of the outermost mobile tower 22.

Referring to step 102, the angle value is compared to a threshold angle value. The control processing element 50 receives the angle threshold value from a technician, operator, or owner through the user interface 48 at the central pivot 14 or from a mobile electronic device or a computer executing an app or visiting a website. The angle threshold value may be a rotational angular value such as 10 degrees.

Referring to step 103, control signals and/or data that includes an activation hysteresis value are generated and transmitted to each drive motor 26 whose associated mobile tower 22 has an angle value greater than the threshold angle value. The control signals and/or data may include a direction to travel and a speed. The activation hysteresis value includes a period of time for the drive motor 26 to be activated, a distance for the drive motor 26 to propel the associated mobile tower 22, or a tower to tower alignment angle or trim angle for the drive motor 26 to propel the mobile tower 22 back to. For example, the activation hysteresis value may include a period of time value of, say, 120 seconds during which the drive motor 26 is activated to propel its associated mobile tower 22. The activation hysteresis value may include a distance value of, say, 200 feet for the drive motor 26 to propel its associated mobile tower 22. The activation hysteresis value may include the angle value of, say, 5 degrees to which the drive motor 26 propels its associated mobile tower 22.

Referring to step 104, the drive motor 26 is activated for a duration of the activation hysteresis value, or until requirements of the activation hysteresis value are satisfied. That is, the drive motor 26 is activated until the specified period of time has elapsed, the mobile tower 22 has been propelled the specified distance, or the mobile tower 22 has been propelled the specified angle. Then, the drive motor 26 is deactivated.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

The invention claimed is:

1. An alignment control system for controlling an alignment of a plurality of mobile towers, each mobile tower supporting a section of conduit in an irrigation system, the alignment control system comprising:
 a plurality of tower angle measurement devices, each tower angle measurement device associated with a successive one of the mobile towers and configured to measure an angle value which varies according to a rotation angle of the associated mobile tower relative to one or more of the other mobile towers; and
 a control processing element configured or programmed to:
  receive the angle value from each tower angle measurement device,
  compare the angle value to a threshold angle value, and
  generate and transmit control signals, data, or both to activate a drive motor associated with each mobile tower that has the angle value greater than the threshold angle value until parameters of an activation hysteresis value are satisfied,
  wherein the activation hysteresis value for each mobile tower has a value which varies according to a direction of travel of the mobile tower.

2. The alignment control system of claim 1, wherein the angle value includes a tower to tower alignment angle which is a rotational angle between a centerline of the section of conduit supported by an outward mobile tower and a centerline of the section of conduit supported by an inward mobile tower.

3. The alignment control system of claim 1, wherein the angle value includes a trim angle which is a rotational angle between a centerline of the associated mobile tower and a line drawn from a central pivot of the irrigation system to a center of an outermost mobile tower.

4. The alignment control system of claim 1, wherein the activation hysteresis value includes a period of time for the drive motor to be activated.

5. The alignment control system of claim 1, wherein the activation hysteresis value includes a distance for the drive motor to propel the associated mobile tower.

6. The alignment control system of claim 1, wherein the activation hysteresis value includes a predetermined angle value to which the drive motor propels the associated mobile tower.

7. The alignment control system of claim 1, wherein the tower angle measurement device includes
   a potentiometer that outputs an electric voltage, an electric current, or an electric resistance which varies according to the angle value, or
   a rotary encoder that outputs data or a code which varies according to the angle value.

8. The alignment control system of claim 1, wherein the tower angle measurement device includes
   an analog proximity sensor which measures an angular deflection of the sections of conduit of adjacent mobile towers relative to one another, or
   strain or stress measurement devices to measure the strain or stress on one or more sections of conduit caused by the angular deflection on the conduit due to the joint of two sections of conduit.

9. An irrigation system comprising:
   a conduit configured to carry fluid for irrigating crops, the conduit including a plurality of sections coupled to one another;
   a central pivot configured to supply the fluid to the conduit;
   a plurality of mobile towers configured to rotate the conduit around the central pivot, each mobile tower including:
      a truss section configured to support the conduit, and
      a drive motor configured to propel the mobile tower; and
   an alignment control system for controlling an alignment of the mobile towers, the alignment control system including:
      a plurality of tower angle measurement devices, each tower angle measurement device associated with a successive one of the mobile towers and configured to measure an angle value which varies according to a rotation angle of the associated mobile tower relative to one or more of the other mobile towers, and
      a control processing element configured or programmed to:
         receive the angle value from each tower angle measurement device,
         compare the angle value to a threshold angle value, and
         generate and transmit control signals, data, or both to activate a drive motor associated with each mobile tower that has the angle value greater than the threshold angle value until parameters of an activation hysteresis value are satisfied,
      wherein the activation hysteresis value for each mobile tower has a value which varies according to a direction of travel of the mobile tower.

10. The irrigation system of claim 9, wherein the activation hysteresis value includes a period of time for the drive motor to be activated.

11. The irrigation control system of claim 9, wherein the activation hysteresis value includes a distance for the drive motor to propel the associated mobile tower.

12. The irrigation control system of claim 9, wherein the activation hysteresis value includes a predetermined angle value to which the drive motor propels the associated mobile tower.

13. The alignment control system of claim 9, wherein the tower angle measurement device
   includes a potentiometer that outputs an electric voltage, an electric current, or an electric resistance which varies according to the angle value, or
   a rotary encoder that outputs data or a code which varies according to the angle value.

14. A method for controlling an alignment of a plurality of mobile towers, each mobile tower supporting a section of conduit in an irrigation system, the method comprising:
   receiving a plurality of angle values, each angle value received from a successive one of a plurality of tower angle measurement devices, each tower angle measurement device associated with a successive one of the mobile towers;
   comparing each angle value to a threshold angle value; and
   activating a drive motor associated with each mobile tower whose angle value greater than the threshold angle value for a duration of an activation hysteresis value,
   wherein the activation hysteresis value for each mobile tower has a value which varies according to a direction of travel of the mobile tower.

15. The method of claim 14, wherein the activation hysteresis value includes a period of time for the drive motor to be activated.

16. The method of claim 14, wherein the activation hysteresis value includes a distance for the drive motor to propel the associated mobile tower.

17. The method of claim 14, wherein the activation hysteresis value includes a predetermined angle value to which the drive motor propels the associated mobile tower.

* * * * *